(12) United States Patent
De Souza et al.

(10) Patent No.: US 7,975,966 B2
(45) Date of Patent: Jul. 12, 2011

(54) ICING PROTECTION FOR AIRCRAFT AIR INLET SCOOPS

(75) Inventors: Francisco José De Souza, São José dos Campos (BR); Luis Gustavo Trapp, São José dos Campos (BR)

(73) Assignee: EMBRAER - Empresa Brasileira de Aeronautica S.A., Sao Jose dos Campos - SP (BR)

( * ) Notice: Subject to any disclaimer, the term of this patent is extended or adjusted under 35 U.S.C. 154(b) by 495 days.

(21) Appl. No.: 12/025,168

(22) Filed: Feb. 4, 2008

(65) Prior Publication Data
US 2009/0194633 A1   Aug. 6, 2009

(51) Int. Cl.
*B64D 15/02* (2006.01)
*B64D 15/04* (2006.01)

(52) U.S. Cl. ................... 244/134 B; 60/39.093

(58) Field of Classification Search ........... 244/134 R, 244/134 B, 53 B, 134 C, 57; 60/39.093; 137/15.1
See application file for complete search history.

(56) References Cited

U.S. PATENT DOCUMENTS

| | | | | |
|---|---|---|---|---|
| 4,406,431 A * | 9/1983 | Heuberger | ........... | 244/53 B |
| 4,674,714 A * | 6/1987 | Cole et al. | ........... | 244/134 B |
| 4,738,416 A * | 4/1988 | Birbragher | ........... | 244/134 B |
| 6,193,192 B1 * | 2/2001 | Porte | ........... | 244/134 B |
| 6,427,434 B2 * | 8/2002 | Porte et al. | ........... | 60/39.093 |

* cited by examiner

*Primary Examiner* — Joshua J Michener
*Assistant Examiner* — Joseph W Sanderson
(74) *Attorney, Agent, or Firm* — Nixon & Vanderhye P.C.

(57) ABSTRACT

Aircraft air scoop icing protection systems and methods include an air duct having air inlet and outlet openings and a fairing which covers the air duct and defines an interior fairing space in which at least a forward portion of the air duct is positioned. The fairing has a forward end which surrounds the air inlet of the air duct. At least one tube is provided having an inlet end in communication with a heated air chamber associated with an airframe structure of the aircraft, and an outlet end in communication with the interior fairing space. Heated air in the heated chamber is directed through the tube to the interior fairing space so as to provide icing protection to the air duct. The air scoop icing protection systems may advantageously be employed so as to provide icing protection to air scoops associated with an aircraft engine nacelle using the residual heat from the nacelle's inlet lip primary bleed air system.

18 Claims, 3 Drawing Sheets

ICING PROTECTION FOR AIRCRAFT AIR INLET SCOOPS

FIELD OF THE INVENTION

The devices and methods disclosed herein relate generally to aircraft icing protection techniques. In preferred forms, the disclosed devices and methods provide icing protection for aircraft air inlet scoops utilizing residual thermal energy from heated air discharged from an aircraft's primary bleed air icing protection system.

BACKGROUND AND SUMMARY OF THE INVENTION

Aircraft in flight sometimes encounter icing conditions whereby ice accretes onto airframe components. If left unchallenged, ice accretion on airframe components severely degrades aircraft performance, for example, by degrading the aerodynamic characteristics of lift surfaces, disruption of engine air flow and blockage of cooling air inlets and the like. Therefore, aircraft certified for flight into known icing conditions will have its flight critical airframe components equipped with icing protection systems.

A variety of icing protection systems are known. For example, airframe components may be provided with electrical resistance heaters in the vicinity of likely ice accretion (usually the leading edge surfaces of an airframe component in flight) which serve to heat the airframe components so as to prevent ice formation and/or to allow already accreted ice to be shed. Alternatively (or additionally) icing protection fluid (typically an alcohol based fluid) can be sprayed or caused to flow onto airframe ice accretion regions so as to preclude ice formation.

Another form of an icing protection system that is usually found on turbine powered aircraft and is known colloquially as a "bleed air" system. Conventional anti-ice bleed air systems employ heated air that is taken from (bled) from the compressor section of the engine and ducted to airframe components in need of anti-ice protection, such as leading edges of the aircraft lift surfaces (i.e., so as to prevent degradation of aerodynamic properties), inlet lips of engine nacelles (i.e., so as to prevent blockage or loss of efficiency of engine combustion air inlets and/or ice shedding that can damage the engine), and the like.

Broadly, the subject matter disclosed herein provides for devices and methods which provide icing protection for aircraft air inlet scoops utilizing residual thermal energy from heated air discharged from an aircraft's primary bleed air icing protection system.

According to some embodiments, the invention provides aircraft air scoop icing protection systems having an air duct provided with air inlet and outlet openings, a fairing which covers the air duct and defines an interior fairing space in which at least a forward portion of the air duct is positioned, the fairing having a forward end which surrounds the air inlet of the air duct, a tube having an inlet end in communication with a heated air chamber associated with an airframe part of the aircraft (e.g., a chamber which receives primary bleed air from the aircraft's engine), and an outlet end in communication with the interior fairing space. As such, the heated air in the heated chamber, which has already served its primary purpose of providing anti-ice protection to the associated airframe part but which also has residual heat energy, is directed through the tube to the interior fairing space so as to provide icing protection to the air scoop. The fairing is preferably provided with a rearward discharge end to allow heated air introduced into the interior fairing space to be discharged therefrom.

The aircraft air scoop icing protection system may be comprised of a pair of tubes each having an inlet end in communication with a heated air chamber associated with an airframe structure of the aircraft and an outlet end in communication with the interior fairing space. The pair of tubes may be oriented so that the discharge ends are positioned laterally adjacent the air duct.

The icing protection system as disclosed herein is especially useful for providing icing protection to engine nacelle air scoops. Thus, according to other aspects of the invention, an engine nacelle is provided which comprises an inlet lip which defines a chamber for receiving heated bleed air, and an air inlet scoop adjacent the inlet lip which includes an icing protection system as disclosed herein. Specifically, it is preferred that the icing protection system will include an air duct having air inlet and outlet openings, a fairing which covers the air duct and defines an interior fairing space in which at least a forward portion of the air duct is positioned, the fairing having a forward end which surrounds the air inlet of the air duct, a tube having an inlet end in communication with the chamber of the inlet lip of the engine nacelle, and an outlet end in communication with the interior fairing space. In such an arrangement, heated air in the chamber is directed through the tube to the interior fairing space so as to provide icing protection to the air duct.

The engine nacelle may comprise a bleed air conduit positioned in the chamber of the inlet lip. The bleed air conduit will have apertures for directing heated engine bleed air against an interior surface of the inlet lip. The heated air will thus be contained within the chamber where it may be redirected via one or more tubes to the interior fairing space to allow its residual heat energy to provide icing protection to the air scoop.

According to other aspects of the invention, icing protection for an aircraft air scoop are provided by providing an air scoop having a fairing over a portion of an air inlet duct so as to define an interior fairing space, establishing fluid communication between a heated chamber associated with an airframe structure and the interior fairing space, and allowing heated air from the heated chamber to flow into the interior fairing space and thereby provide icing protection to the air scoop. Preferably, the step of establishing fluid communication between the heated chamber associated with an airframe structure and the interior fairing space is provided by one or more tubes extending therebetween.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
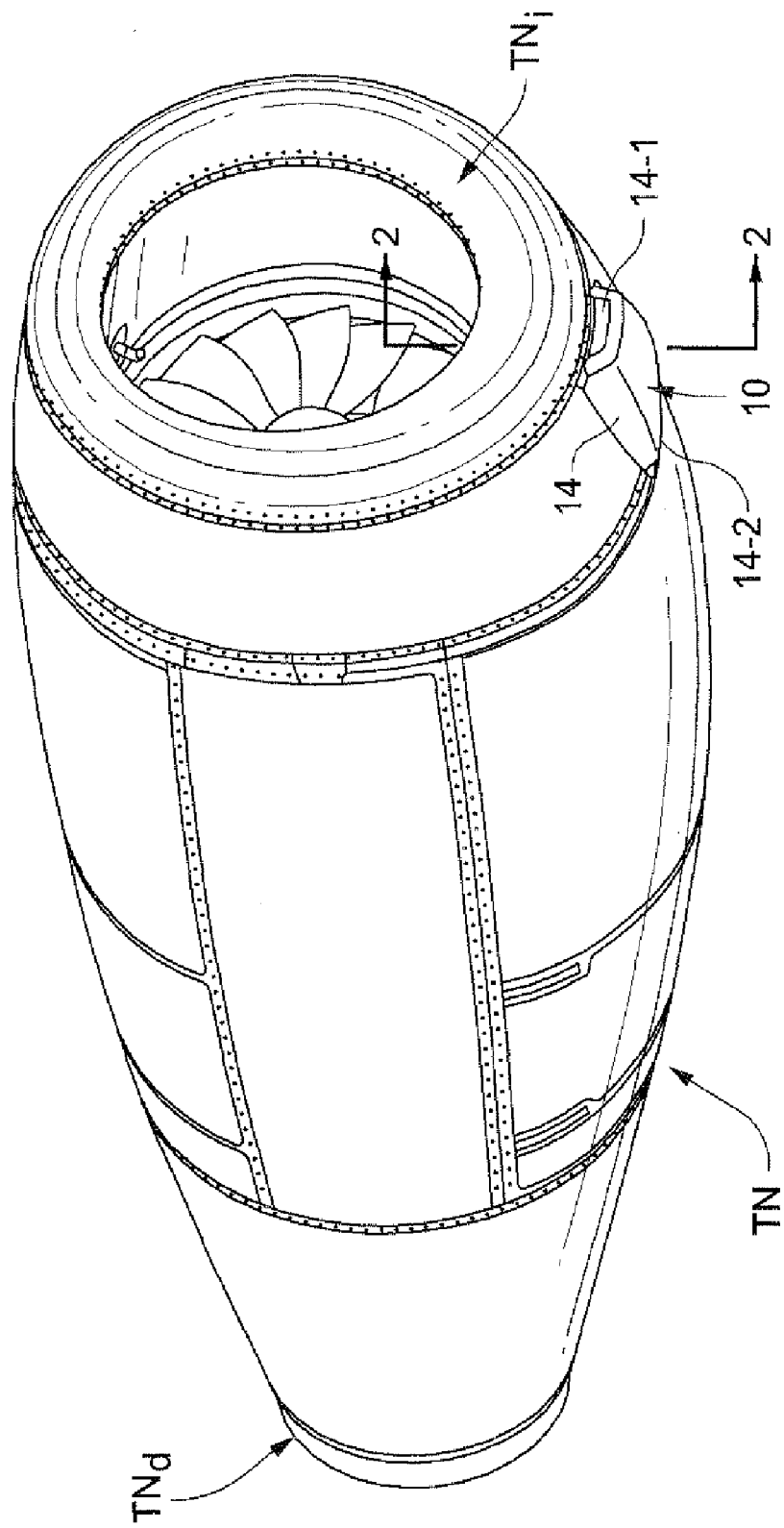
FIG. 1 is a perspective view of an aircraft turbofan nacelle which includes an air scoop anti-ice system according to the present invention.

Accompanying FIG. 1 depicts a turbofan nacelle TN having a forward air inlet lip $TN_i$ and a rearward thrust discharge end $TN_d$. The nacelle TN is adapted to being supported by an airframe structure, such as the aircraft wings or fuselage, so that the engine can provide unobstructed thrust for aircraft propulsion when operated. A ram air scoop 10 is positioned adjacent the nacelle inlet lip $TN_i$.

Figure 2:
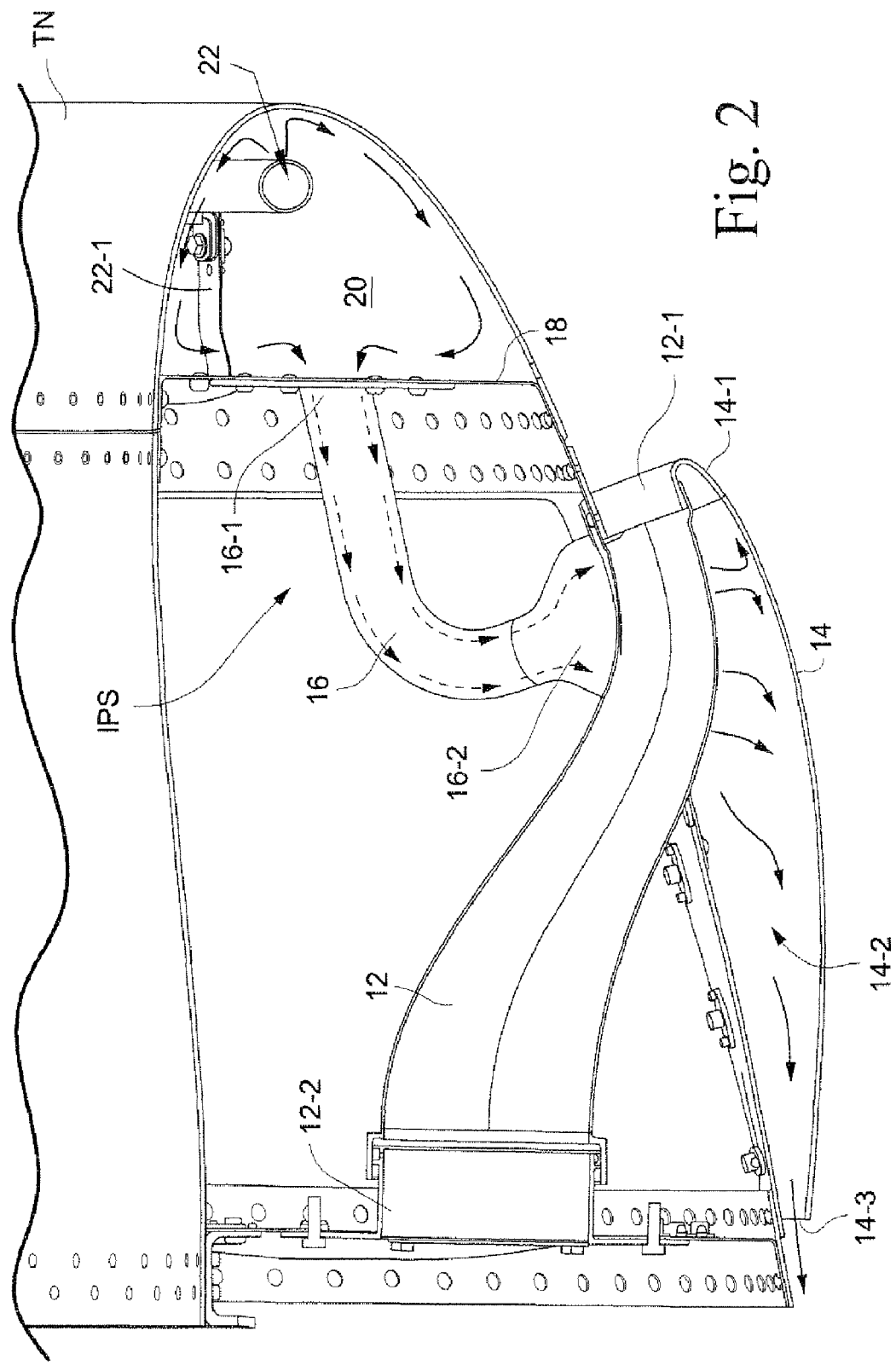
FIG. 2 is an enlarged partial cross-sectional view of the nacelle air scoop as taken along line 2-2 in FIG. 1 showing the anti-ice system.

As is perhaps best shown in FIG. 2, the air scoop 10 includes a ram air duct 12 having a forward air inlet opening 12-1 and a rear air discharge opening 12-2. A fairing 14 covers at least a forward end portion of the air duct 12 and includes a forward end 14-1 which surrounds the air inlet opening 12-1. The fairing 14 defines a space 14-2 which terminates in a rearward discharge opening 14-3.

Figure 3:
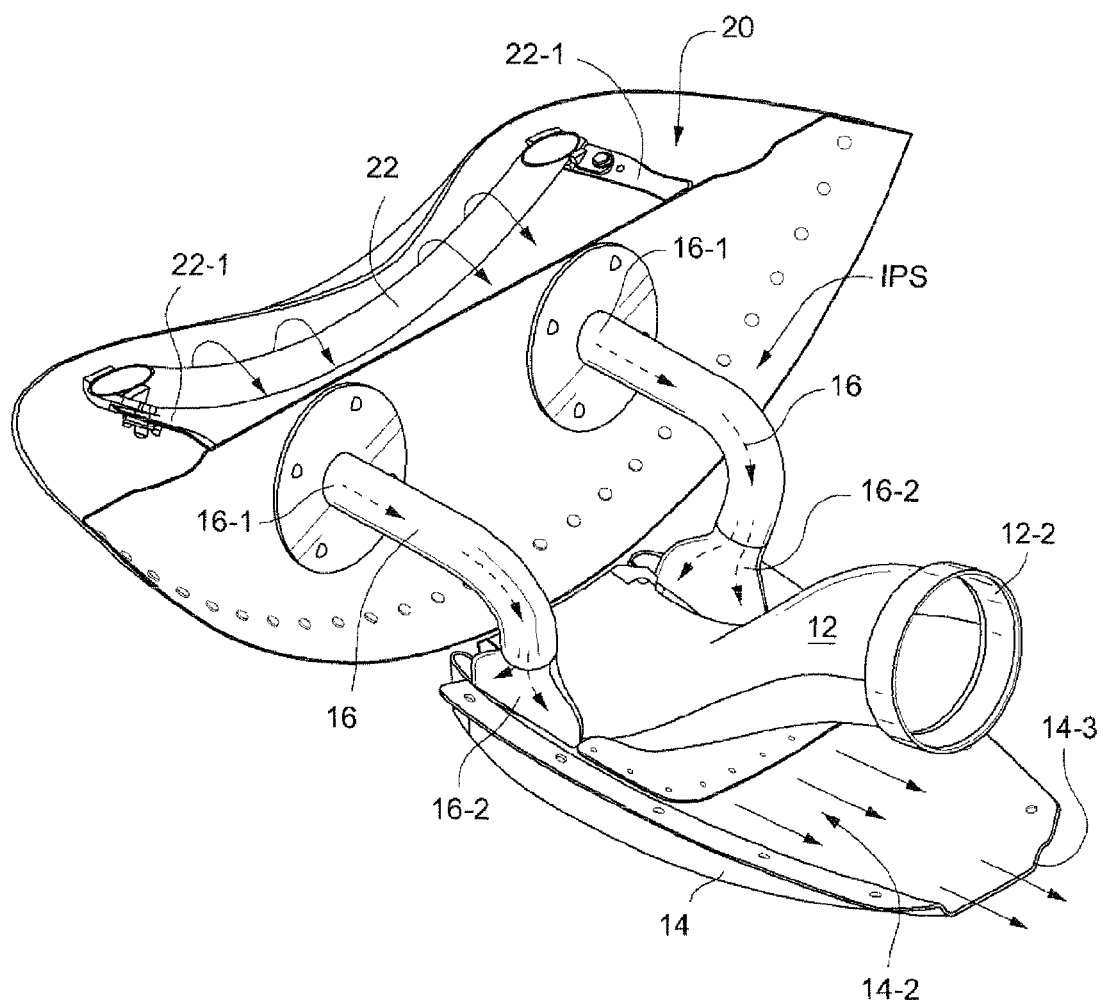
FIG. 3 is a disembodied rear perspective view showing the air scoop icing protection system.

As shown in FIG. 3, the air scoop icing protection system IPS includes a pair of tubes 16 each having an inlet end 16-1 which penetrates through a bulkhead plate 18 provided in the nacelle inlet end $TN_i$ so as to be in fluid communication with the nacelle inlet lip chamber 20. The outlet ends 16-2 of the tubes 16 are in fluid communication with the space 14-2 of the fairing 14. Most preferably, the pair of tubes 16 are oriented so that the outlet ends 16-2 are positioned laterally adjacent the air duct 12.

The inlet lip chamber 20 houses the primary bleed air conduit 22 supported by support arms 22-1 so as to be closely adjacent the interior surface of the nacelle inlet lip $TN_i$. The bleed air conduit 22 includes forwardly oriented openings (not shown) so that heated bleed air from the turbofan which is directed through the conduit 22 is caused to be forcibly impinged against the interior surface of the nacelle inlet lip $TN_i$. The heated air impinging on the interior surface of the nacelle inlet lip $TN_i$ thereby provides anti-ice protection to the nacelle inlet lip $TN_i$, i.e., by preventing ice accumulation or removing ice if already accumulated.

The heated air within the inlet lip chamber 20 will still have substantial residual heat after being impinged on the inlet lip $TN_i$. Such heated air in the inlet lip chamber 20 will therefore pass through the bulkhead 18 via the inlet ends of the tubes 16 and be directed by the tubes 16 so as to be discharged through the outlet ends 16-2 and into the interior fairing space 14-2. The heated air within the space 14-2 of the fairing 14 will therefore heat the air duct 12 and its inlet opening 12-1 so as to provide anti-ice protection to such structures. The air within the space 14-2 is subsequently discharged through the discharge opening 14-3. Therefore, by virtue of the icing protection system IPS, the air inlet 12-1 of the air duct 12 may be kept free of ice during flight in icing conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft icing protection system comprising a primary icing protection system to provide icing protection to an airframe structure, and a secondary icing protection system to provide icing protection to an air scoop of the aircraft, wherein the primary icing protection system comprises,
    a heated air chamber; and
    a supply conduit for supplying heated air from a source thereof to the heated air chamber such that heat of the heated air within the heated air chamber is transferred to the airframe structure to provide icing protection thereto; and wherein the secondary icing protection system comprises,
    an air duct connected to the air scoop having air inlet and outlet openings;
    a fairing which covers the air duct and defines an interior fairing space in which at least a forward portion of the air duct is positioned, the fairing having a forward end which surrounds the air inlet of the air duct;
    at least one tube having an inlet end in communication with the heated air chamber of the primary icing protection system and an outlet end in communication with the interior fairing space of the secondary icing protection system, wherein air containing residual heat that remains in the heated chamber of the primary icing protection system is directed through the tube to the interior fairing space so that the residual heat thereof is transferred to the air duct and thereby provide icing protection to the air scoop.

2. An aircraft icing protection system as in claim 1, further comprising a pair of tubes each having an inlet end in communication with the heated air chamber associated with the airframe structure of the aircraft and an outlet end in communication with the interior fairing space.

3. An aircraft icing protection system as in claim 2, wherein the tubes are oriented so that the discharge ends are positioned laterally adjacent the air duct.

4. An aircraft icing protection system as in claim 1, wherein the fairing has a rearward discharge end to allow air introduced into the interior fairing space to be discharged therefrom.

5. An engine nacelle comprising:
    an inlet lip having a bulkhead plate which defines an interior chamber of the inlet lip for receiving heated bleed air of an engine surrounded by the nacelle to provide anti-icing protection to the inlet lip,
    a primary bleed air conduit positioned within the chamber of the inlet lip having forwardly oriented apertures for directing the heated bleed air onto an interior surface of the inlet lip; and
    an air inlet scoop adjacent the inlet lip, the air inlet scoop having an icing protection system which comprises:
    an air duct having air inlet and outlet openings;
    a fairing which covers the air duct and defines an interior fairing space in which at least a forward portion of the air duct is positioned, the fairing having a forward end which surrounds the air inlet of the air duct;
    at least one opening formed in the bulkhead plate;
    at least one tube having an inlet end connected to the at least one bulkhead plate opening so as to provide communication with the chamber of the inlet lip of the engine nacelle, and an outlet end in communication with the interior fairing space, wherein heated air directed onto the interior surface of the inlet lip of the chamber is redirected through the at least one bulkhead opening and into the tube so as to be discharged into the interior fairing space thereby providing icing protection to the air duct.

6. An engine nacelle as in claim 5, further comprising a pair of openings in the bulkhead, and a pair of tubes, wherein each of the tubes includes an inlet end connected to a respective one of the bulkhead openings so as to provide communication with the heated bleed air within the interior chamber, and an outlet end in communication with the interior fairing space.

7. An engine nacelle as in claim 6, wherein the tubes are oriented so that the discharge ends are positioned laterally adjacent the air duct.

8. An engine nacelle as in claim 5, wherein the fairing has a rearward discharge end to allow heated air introduced into the interior fairing space to be discharged therefrom.

9. An engine nacelle as in claim 5, wherein the primary bleed air conduit comprises support arms connected to the bulkhead plate to support the primary bleed air conduit adjacent the interior surface of the inlet lip.

10. A method of providing icing protection to an aircraft air scoop associated with an engine nacelle, the method comprising:
   (a) providing an inlet lip of the nacelle with a bulkhead plate which defines an interior chamber of the inlet lip for receiving heated bleed air of an engine surrounded by the nacelle to thereby provide anti-icing protection to the inlet lip;
   (b) positioning a primary bleed air conduit having forwardly directed apertures within the chamber of the inlet lip to direct the heated bleed air onto the interior surface of the inlet lip;
   (c) providing an air inlet scoop having a fairing over a portion of an air inlet duct so as to define an interior fairing space;
   (d) establishing fluid communication between the interior chamber associated with the inlet lip of the engine nacelle and the interior fairing space by (b1) connecting an inlet end of a tube to an opening formed in the bulkhead plate, and (b2) connecting an outlet end of the tube with the interior fairing space; and
   (e) allowing heated air directed onto the interior surface of the inlet lip of the chamber to be redirected into the tube so as to be discharged into the interior fairing space and thereby provide icing protection to the air scoop.

11. A method as in claim 10, wherein step (b) is practiced by providing a pair of tubes each having an inlet end connected to a respective opening in the bulkhead plate and an outlet end communicating with the faring space so that each tube extends between the chamber of the inlet lip and the interior fairing space.

12. A method as in claim 11, comprising positioning outlet ends of the pair of tubes laterally adjacent the air duct.

13. A method as in claim 10, further comprising allowing air to be discharged from the interior fairing space through a rearward discharge opening.

14. A method as in claim 10, which further comprises supporting the primary bleed air conduit within the chamber by means of support arms attached to the bulkhead plate.

15. A method to provide icing protection to an airframe structure and an air scoop of an aircraft, the method comprising:
   (a) providing a primary icing protection system to provide icing protection to the airframe structure, the primary icing protection system comprising a heated air chamber and a supply conduit to allow heated air to be introduced into the heated air chamber;
   (b) providing a secondary icing protection system to provide icing protection to the air scoop, the secondary icing protection system comprising an air duct connected to the air scoop having air inlet and outlet openings, a fairing which covers the air duct and defines an interior fairing space in which at least a forward portion of the air duct is positioned, the fairing having a forward end which surrounds the air inlet of the air duct, and at least one tube having inlet and outlet ends;
   (c) supplying heated air from a source thereof to the heated chamber of the primary icing protection system such that heat of the heated air within the heated air chamber is transferred to the airframe structure to provide icing protection thereto;
   (d) establishing communication between the inlet end of the fairing of the secondary icing protection system and the heated air chamber of the primary icing protection system, and between the outlet end of the fairing and the interior fairing space; and
   (e) allowing air containing residual heat which remains in the heated air chamber of the primary icing protection system to be transferred through the tube from the heated air chamber of the primary icing protection system to the fairing space so that the residual heat thereof is transferred to the air duct and thereby provide icing protection to the air scoop.

16. A method as in claim 15, further comprising providing a pair of tubes each having an inlet end in communication with the heated air chamber associated with the airframe structure of the aircraft and an outlet end in communication with the interior fairing space.

17. A method as in claim 16, further comprising orienting the tubes so that the discharge ends are positioned laterally adjacent the air duct.

18. A method as in claim 16, further comprising providing the fairing space with a discharge end to allow for the air introduced into the interior fairing space to be discharged therefrom.

* * * * *